United States Patent [19]
Yasuda et al.

[11] Patent Number: 5,578,913
[45] Date of Patent: Nov. 26, 1996

[54] NC DEVICE CONTROLLING MACHINING PROCESSES WITH PRE- AND POST-EXECUTION IN-POSITION VALUES

[75] Inventors: Shouki Yasuda, Nagoya; Koichi Yasumoto, Konan; Katsunori Tsutsui, Chita-gun, all of Japan

[73] Assignee: Brother Kogyo Kabushiki Kaisha, Nagoya, Japan

[21] Appl. No.: 343,938

[22] Filed: Nov. 17, 1994

[30] Foreign Application Priority Data

Nov. 17, 1993 [JP] Japan ................... 5-288215

[51] Int. Cl.$^6$ ................................ H02D 5/00
[52] U.S. Cl. ............ 318/569; 318/567; 364/474.28
[58] Field of Search ............ 364/474.01–474.37; 318/562, 561, 562.3, 567, 569–574, 568.1

[56] References Cited

U.S. PATENT DOCUMENTS

| 4,475,160 | 10/1984 | Inaba | 318/568 X |
| 4,785,221 | 11/1988 | Neka | 318/567 X |
| 4,902,950 | 2/1990 | Kawamura et al. | 318/626 X |
| 4,949,025 | 8/1990 | Iwagaya et al. | 318/569 |
| 4,956,785 | 9/1990 | Kawamura et al. | 364/474.01 |
| 4,965,737 | 10/1990 | Iwagaya | 318/568.1 X |

*Primary Examiner*—David S. Martin
*Attorney, Agent, or Firm*—Oliff & Berridge

[57] ABSTRACT

A numerical control device can perform machining processes in a short time while maintaining high precision, regardless of the order at which programs are commanded. Consecutive blocks of a numerical control program are retrieved on a block-by-block basis, and a pre-execution in-position value and a post-execution in-position value for each of the blocks of the numerical control program are set and stored in a ROM. The block of the numerical control program is executed in accordance with at least one of the corresponding pre-execution in-position value and the post-execution in-position value. In one embodiment, if the post-execution in-position value of a formerly retrieved block is large and the pre-execution in-position value of the subsequently retrieved block is small by retrieving two consecutive blocks, the post-execution in-position value of the formerly retrieved block is rewritten to a small value, and the block of the program is executed in accordance with the rewritten post-execution in-position value.

34 Claims, 5 Drawing Sheets

NC DEVICE CONTROLLING MACHINING PROCESSES WITH PRE- AND POST-EXECUTION IN-POSITION VALUES

BACKGROUND OF THE INVENTION

1. Field of the Invention

The present invention relates to a numerical control (NC) device for performing machining processes in precision at high speeds by changing in-position values depending on various commands.

2. Description of the Related Art

Numerical control devices can be used for controlling, for example, a machine tool. Such a numerical control device is provided with a numerical control program by which a tool of the machining equipment is guided in regards to a workpiece. Servo motors for moving the tool are connected to servo circuitry for driving respective axes of servo motors. An error register is provided in the circuitry for each axis. The error registers are for storing deviations between commanded movement amounts and actual movement amounts of the tool.

To perform machining operations, the numerical control device retrieves one block of the numerical control program. When the block of program includes a command for moving the tool, such as to position the tool or to cut with the tool, the machining processes, that is, positioning or cutting, are executed by driving the servo motors of the relevant axes according to the command contained in the block of program. To reach a target position, the servo motors are repeatedly rotated in one direction and then the opposite direction, whereby the tool overshoots the target position by less with each switch in rotation direction, to thus move the tool increasingly closer to the target position.

Whether or not the tool has reached the target position commanded by the block of program is determined by whether the deviation in each error register is within a predetermined range. This predetermined range will be referred to as an in-position value hereinafter. When the tool is within the in-position value, the next process in the block is started. This can allow machining a workpiece into a shape commanded by the numerical control program.

When the in-position value is set to a small value, positioning is precise, but a great deal of time is required to maneuver the tool to fall within the in-position value because the servo motors must be switched between positive and negative rotation a great number of times. On the other hand, when the in-position value is set to a large value, only a short time is required to maneuver the tool until it falls within the in-position value. Although the next process can be quickly undertaken, positioning precision is poor. For this reason, in a numerical control device, two types of in-position values are prepared: a large value and a small value. The small in-position value is used when precise positioning is required, and the large in-position value is used when rough positioning can be tolerated.

U.S. Pat. No. 4,949,025 describes determining whether the small or the large in-position value should be adopted based on two consecutive commands. For example, the large value may be employed if two consecutive movement commands are both rapid feed commands or if one is a rapid feed command and the other a cutting command, and the small value may be employed if both are cutting commands. With this technique, total process time can be shortened while precision is maintained.

Figure 1:
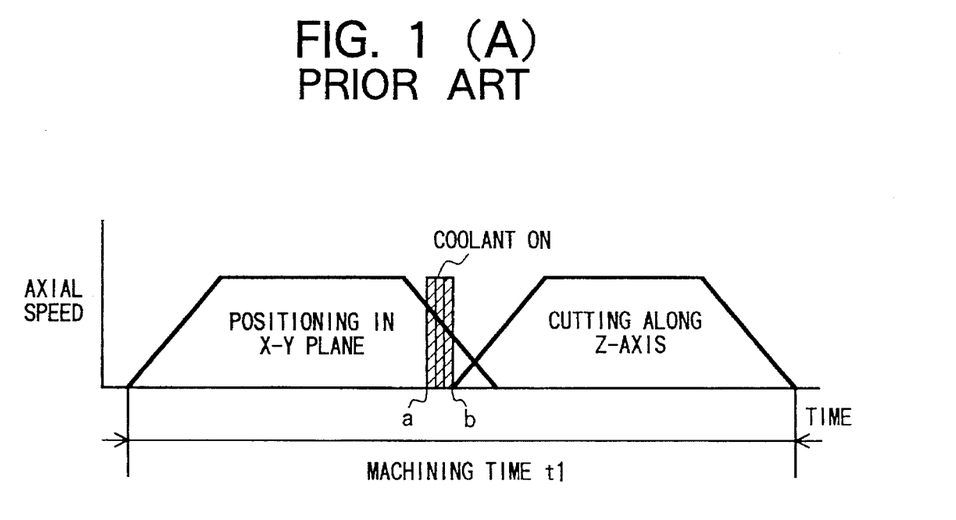
FIGS. 1(A) and 1(B) are graphical representations showing temporal changes in the axial speed of a servo motor in an apparatus controlled by a conventional numerical control device.

However, FIGS. 1(A) and 1(B) depict possible problems that can arise with the technique described in U.S. Pat. No. 4,949,025 when the present block is a movement command, for example, a command for positioning the tool in a plane defined by the X and Y axes, and the next block is a non-movement command whose execution time is very short such as a command for turning ON a flow of coolant. As shown in FIG. 1(A), when, based on the combination of a movement command in the present block and the non-movement command in the next block, the in-position value for the present block is set to the large value, flow of coolant is turned ON at time a, before positioning of the tool in the plane of X and Y axes is completed. Flow of coolant is completed at time b, whereupon execution of the next block begins. Because coolant flows for only a short duration of time, the tool has not yet reached the target position in the plane of X and Y axes at time b. When, as depicted in FIG. 1(A), the following block is a movement command for cutting in the direction of the Z axis, cutting starts from an inaccurate position because the tool has not been accurately positioned in the X-Y plane, thus resulting in inferior machining.

Inaccurate cutting caused by the problem depicted in FIG. 1(A) can be overcome by setting the in-position value for the present block to the small value based on the combination of a movement command in the present block and the non-movement command in the next block. However, this creates another problem, as depicted in FIG. 1(B). When, as in this example, the command following the non-movement command is a positioning command for moving in the Z axis direction, positioning in the X-Y plane is continued until time c at which time the tool is precisely positioned over the target position. Such precision is unnecessary for the non-movement command of turning flow of coolant ON. This unnecessary precision increases total machining time t2.

SUMMARY OF THE INVENTION

It is an object of the present invention to overcome the above-described problems, and to provide a numerical control device that can perform machining processes in a short time while maintaining high precision, regardless of the order at which programs are commanded.

To achieve the above and other objects, there is provided a numerical control device that includes retrieving means for retrieving consecutive blocks of a control program on a block-by-block basis. The numerical control program is prepared for performing machining processes. Memory means is provided for storing a pre-execution in-position value and a post-execution in-position value for each of the blocks of the numerical control program. The pre-execution in-position value indicates a first tolerance allowed to be obtained before a corresponding block of the numerical control program is executed. The post-execution in-position value indicates a second tolerance allowed to be obtained after the corresponding block of the numerical control program has been executed. Control means is provided for controlling execution of the block of the numerical control program in accordance with at least one of the corresponding pre-execution in-position value and the post-execution in-position value.

In one aspect of the invention, the control means includes in-position determining means for determining whether a current machining processing position is within the pre-execution in-position value and the post-execution in-position value. More specifically, the control means includes pre-execution determining means for comparing the pre-execution in-position value stored in the memory means with the current machining processing position and outputting a first comparison result, and execution means for executing the block of the numerical control program retrieved from the retrieving means when the first comparison result output from the pre-execution determining means indicates that the current machining processing position is within the first tolerance. The control means further includes post-execution determining means for comparing the post-execution in-position value stored in the memory means with the current machining processing position and outputting a second comparison result. The retrieving means retrieves successive block of the numerical control program when the second comparison result output from the post-execution determining means indicates that the current machining processing position is within the second tolerance.

According to another aspect of the invention, each of the pre-execution in-position value and the post-execution in-position value takes either a large value or a small value, and rewriting means is provided for rewriting the large post-execution in-position value of a block of the numerical control program to the small post-execution in-position value when the pre-execution in-position value of the successive block of the numerical control program is small. The retrieving means retrieves a predetermined number of blocks of the numerical control program before execution of a firstly retrieved block of the numerical control program, and the rewriting means performs re-writing when two consecutive blocks of the numerical control program are retrieved. In-position determining means is provided for determining whether a current machining processing position is within the post-execution in-position value. Execution means executes the block of the numerical control program when the current machining processing position is within the post-execution in-position value of immediately preceding block of the numerical control program retrieved by the retrieving means.

According to the present invention, moving means is provided for moving a tool relative to a workpiece to be machined by the tool. When the block of the numerical control program indicates positioning of the tool, the in-position determining means compares a current position of the tool with the post-execution in-position value indicating an allowable range of position where the tool is positioned after the corresponding block of the numerical control program has been executed, the allowable ranges of position being equivalent to the first tolerance. The moving means includes an X-axis servo motor for moving the tool in an X-direction, a Y-axis servo motor for moving the tool in a Y-direction perpendicular to the X-direction, and a Z-axis servo motor for moving the tool in a Z-direction perpendicular to both the X-direction and the Y-direction. When the block of the numerical control program indicates positioning of the tool, the memory means stores the pre-execution in-position value and the post-execution in-position value with respect to a position of the tool in each of the X-direction, Y-direction and Z-direction, and the in-position determining means compares the current position of the tool with the post-execution in-position value in each of the X-direction, Y-direction and Z-direction.

BRIEF DESCRIPTION OF THE DRAWINGS

The above and other objects, features and advantages of the invention will become more apparent from reading the following description of preferred embodiments taken in connection with the accompanying drawings in which.

DETAILED DESCRIPTION OF PREFERRED EMBODIMENTS

A numerical control device according to preferred embodiments of the present invention will be described while referring to the accompanying drawings wherein like parts and means are designated by the same reference numerals to avoid duplicating description.

Figure 2:
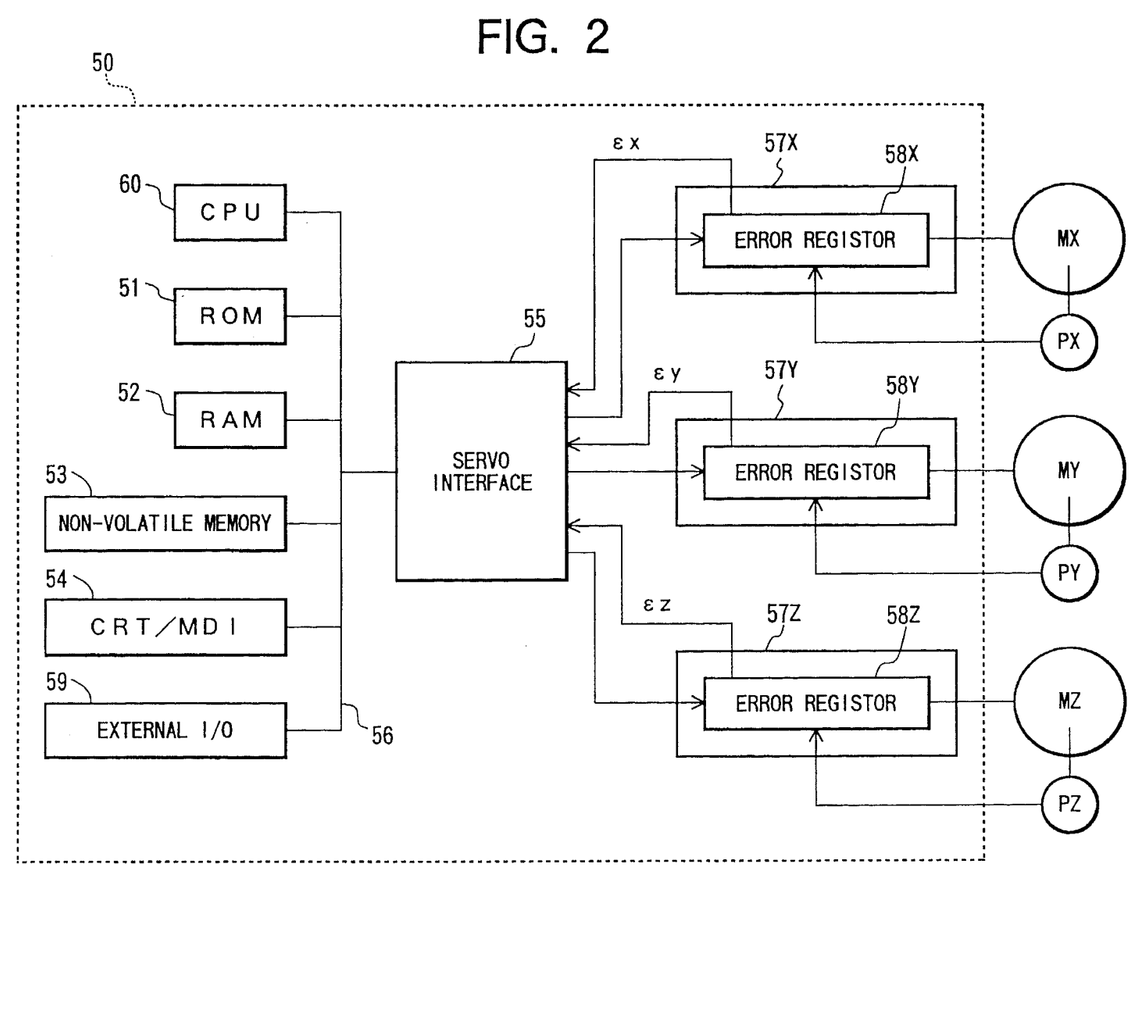
FIG. 2 is a block diagram showing configuration of means in a numerical control device according to the present invention.

As shown in FIG. 2, a numerical control device 50 according to a first preferred embodiment of the present invention includes a CFU 60, a ROM 51, a RAM 52, a non-volatile memory 53, a CRT/MDI device 54, an external data input and output terminal (I/O) 59, and a servo interface 55, all interconnected by buses 56. The CPU 60 is for controlling operations of the numerical control device 50. The ROM 51 is for storing programs and the like for overall control of the numerical control device 50. The RAM 52 is for temporarily storing data, such as in-position values for before and after execution of each axis, as will be described later.

The non-volatile memory 53 is for storing parameters such as for in-position values. As shown in the attached Appendix at Table 1, post-execution in-position values and pre-execution in-position values (to be described later) for each axis are stored in the non-volatile memory 53 according to the combination of commands to be executed. The CRT/MDI device 54 is a manual data input device including a CRT for inputting data, parameters, and the like. The external I/O 59 is for outputting signals to external devices when auxiliary functions, such as turning flow of coolant ON and OFF, are to be executed.

The servo-motor interface 55 is connected to servo circuits 57X, 57Y, and 57Z for driving associated servomotors MX, MY, and MZ of a machine for performing processes such as machining a workpiece with a tool. Error registers 58X, 58Y, and 58Z are provided respectively to servo-circuits 57X, 57Y, and 57Z and in connection with the servo interface 55. Error amounts $\epsilon x$, $\epsilon y$, and $\epsilon z$ (deviations) between commanded movement amounts and actual movement amounts of the tool are stored for respective axes in respective error registers 58X, 58Y, and 58Z. Position detectors PX, PY, and PZ for generating feedback pulses are connected to respective servo-motors MX, MY, and MZ.

When pulse distribution processing is started, pulses for respective axes are distributed to the error registers 58X, 58Y, and 58Z through the servo interface 55. The pulses drive the servo motors MX, MY, and MZ and reduce the error amounts εx, εy, and εz stored in the error register 58X, 58Y, and 58Z. The error amounts εx, εy, and εz are inputted into the servo interface 55 so that the amount of position can be detected. The servo circuitry used in the first preferred embodiment is well known in the art, and only portions thereof relevant to the present invention are indicated in this description.

As described above, in a conventional method, whether the in-position value employed at completion of the present command, that is, the post-execution in-position value, will be small or large is determined by comparing the present command with the next command. In both the first and second embodiments, however, the present command is not compared with the next command to determine the in-position value but the in-position value is determined based only on the present command. Moreover, not only the post-execution in-position value but also the pre-execution in-position value is determined based only on the present command. In the first embodiment, the command is executed upon confirming that the workpiece is within the pre-execution in-position value. In the second embodiment, when the pre-execution in-position value of the command to be executed is set to the small value, the post-execution in-position value of the immediately preceding command is rewritten to the small value. After execution of the command, the following command will be executed upon confirming that the workpiece is within the written post-execution in-position value of the immediately preceding command. The pre- and post-execution in-position values for each command are stored in the non-volatile memory 53 in the form shown in the Appendix at Table 1 by being inputted through the CRT/MDI device 54.

In an automatic drive, the conditions under which the small in-position value (10μ in the preferred embodiments) must be employed are summarized in the following conditions (A), (B), and (C). In all other cases, a large in-position value (1,000μ in the preferred embodiments) can be tolerated.

Condition (A)

When the present command is for cutting in the direction of only one axis, the small in-position value must be employed as the pre-execution in-position value for axes other than the commanded axis and as the post-execution in-position value for all axes. This condition is represented in the Appendix at Table 1 under the command of cutting in the direction of the X axis only, the Y axis only, and the Z axis only.

Condition (B)

When the present command is for cutting in the direction of two axes or more, the small in-position value must be employed as the pre-execution and post-execution in-position values for all axes. This condition is represented in the Appendix at Table 1 under "Others" when the command is cutting.

Condition (C)

When the present command is an auxiliary function command addressed to the workpiece replacing device, such as a robot, the small in-position value must be employed as the pre-execution in-position values for all axes. This condition is represented in Appendix at Table 1 by the command of "Aux. Func. (M77) Workpiece Replacement."

Here, an example of condition (A) will be provided. When cutting is to be performed in the direction of the Z axis, the tool must be accurately positioned in the X-Y plane before cutting. However, as far as the tool is accurately positioned in the X-Y plane, the position of the tool along the Z axis before start of the cutting in the direction of the Z axis may not be accurate. That is, the pre-execution in-position value for the Z axis cutting command need not be small. Therefore, the small in-position value, i.e., 10μ, is employed for the X and Y axes movement commands, and the large in-position value, i.e., 1,000μ, is employed for the Z axis cutting command. However, positioning along all axes must be accurate after execution of the cutting command or else work might be defective. Therefore, the small in-position value is employed for the post-execution in-position values of the X, Y, and Z axes.

In regards to condition (B), when cutting is performed in the direction of the X and Y axes, positioning along all axes needs to be accurate both before and after execution of the command to prevent defective work. Therefore, the small in-position value is employed for the pre- and post-execution in-position values for the X, Y, and Z axes.

Condition (C) relates to a device for replacing a workpiece by a commanded M code being transmitted to a workpiece replacing device, for example, a robot, via the external I/O 59 by an auxiliary function command execution. There is a possibility of damaging the workpiece replacing device unless all the axes are accurately positioned prior to execution. For this reason, the small value is employed for the pre-execution in-position value of the X, Y, and Z axes.

In execution of automatic drive, before the present block is executed, the pre- and post-execution in-position values for each axis for the command are retrieved from Table 1 (shown in the Appendix) and any stored in the RAM 20. That the tool is positioned within the pre-execution in-position value is confirmed before the command is executed. Execution is started after confirmation. When execution of the command is completed, the tool is confirmed to be within the post-execution in-position value. After confirmation, the numerical control program proceeds to the next command block.

Figure 3:
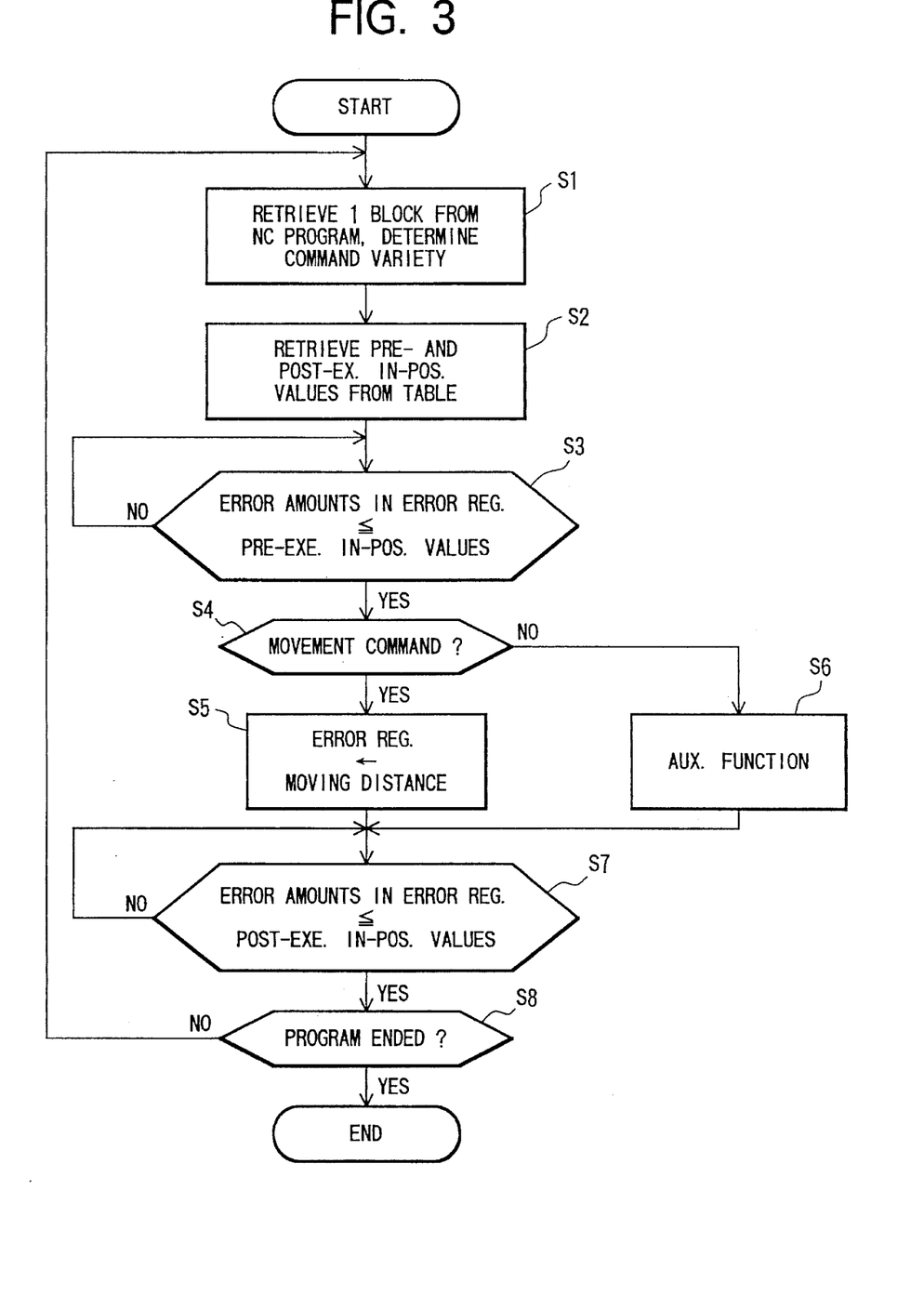
FIG. 3 is a flowchart representing operations followed by a numerical control device according to a first preferred embodiment of the present invention.

Next, a description of processes performed during automatic drive of the numerical control device 50 of the first preferred embodiment will be provided while referring to the flowchart in FIG. 3. When automatic drive is initialized, the CPU 60 retrieves one block command from the numerical control program and analyzes the block command in step 1. The in-position value that corresponds to the block command is retrieved from the Table 1 (shown in the Appendix) and stored in the RAM 52 as pre-execution in-position value and post-execution in-position value of each axis in step 2.

For example, when the block command is positioning along the Z axis, in-position values are set for each axis as follows:

X axis pre-execution in-position value=1,000μ;

Y axis pre-execution in-position value=1,000μ;

Z axis pre-execution in-position value=1,000μ;

X axis post-execution in-position value=1,000μ;

Y axis post-execution in-position value=1,000μ; and

Z axis post-execution in-position value=1,000μ.

On the other hand, if the block command is for cutting in the direction of the Z axis, in-position values are set for each axis as follows:

X axis pre-execution in-position value=10μ;

Y axis pre-execution in-position value=10μ;

Z axis pre-execution in-position value=1,000μ;

X axis post-execution in-position value=10μ;

Y axis post-execution in-position value=10μ; and

Z axis post-execution in-position value=10μ.

Further, if the block command is for turning flow of coolant ON, in-position values are set for each axis as follows:

X axis pre-execution in-position value=1,000μ;

Y axis pre-execution in-position value=1,000μ;

Z axis pre-execution in-position value=1,000μ;

X axis post-execution in-position value=1,000μ;

Y axis post-execution in-position value=1,000μ; and

Z axis post-execution in-position value=1,000μ.

Next, whether the tool is positioned within the pre-execution in-position value is confirmed in the determination step 3. That is, whether the present error amounts ϵx, ϵy, and ϵz for each axis in respective error registers X, 58Y, and 58Z are equal to or less than the pre-execution in-position values is confirmed by the following comparisons:

ϵx≦X axis pre-execution in-position value;

ϵy≦Y axis pre-execution in-position value; and

ϵz≦Z axis pre-execution in-position value.

When the error amounts ϵx, ϵy, and ϵz for each axis in respective error registers 58X, 58Y, and 58Z are greater then the pre-execution in-position values, step 3 is determined as NO. The program continually returns to step 3, in a standby mode, until step 3 is determined as YES.

When the error amounts ϵx, ϵy, and ϵz for each axis in respective error registers 58X, 58Y, and 58Z are equal to or less than the pre-execution in-position values, i.e., the determination step 3 is YES, the program proceeds to step 4, where a determination is made as to whether the command is a movement command. The program proceeds to the process step corresponding to the command. For example, when the command is a movement command, i.e., step 4 is YES, the program proceeds to step 5. The movement command values for the retrieved block are set in the error registers 58X, 58Y, and 58Z through the servo interface 55. Then pulse distribution processes are initiated for driving the servo-motors MX, MY, and MZ while the error registers 58X, 58Y, and 58Z are decremented by feedback pulses generated by the position detectors PX, PY, and PZ. The servomotors MX, MY, and MZ drive the tool toward the target position while error amounts ϵx, ϵy, and ϵz in the error registers 58X, 58Y, and 58Z are reduced to zero.

When the command is determined as not being a movement command, for example, when the command is determined to be a command for turning flow of coolant ON, the determination made in step 4 becomes NO, so that the program proceeds to step 6, whereupon auxiliary functions, such as turning flow of coolant ON, are performed. The M code 08 of the retrieved block is outputted to the external portion I/O 59, so that the coolant valve is opened and lubrication oil is discharged onto the area to be cut. Other than turning flow of coolant ON, the numerical control device 60 performs in step 6 other processes, such as turning flow of coolant OFF, and replacing a workpiece.

Whether execution of processes for each axis have been completed or not is determined in step 7 by confirming the post-execution in-position value. That is, whether the error amounts ϵx, ϵy, and ϵz in the error registers 58X, 58Y, and 58Z are equal to or less than the post-execution in-position values for each axis is confirmed according to the following comparisons:

ϵx≦X axis post-execution in-position value;

ϵx≦Y axis post-execution in-position value; and

ϵx≦Z axis post-execution in-position value.

The program will not proceed to the next step as long as the error amounts ϵx, ϵy, and ϵz in the error registers 58X, 58Y, and 58Z are greater then the post-execution in-position values for each axis, that is, as long as the determination in step 7 is NO.

When the error amounts ϵx, ϵy, and ϵz in the error registers 58X, 58Y, and 58Z are equal to or less than the post-execution in-position values for each axis, the completion of the processes of the command is confirmed so that the program proceeds to step 8, where a determination is made as to whether the numerical control program has been completed. If so, i.e., step 8 is YES, automatic drive is terminated. If not, i.e., step 8 is NO, the program returns to step 1 so that process of the next command block are initiated.

Figure 4:
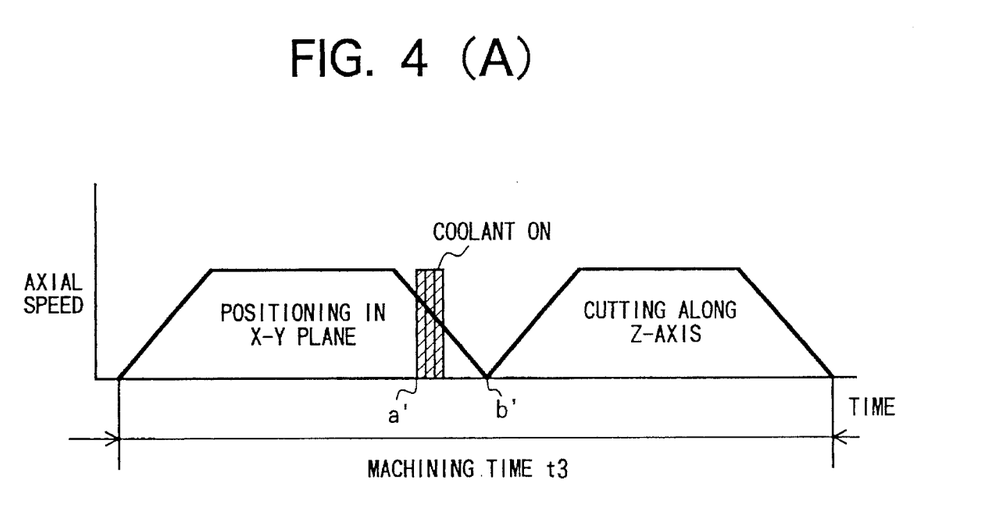
FIGS. 4(A) and 4(B) are graphical representations showing temporal changes in the axial speed of a servo motor in an apparatus controlled by the numerical control device according to the first preferred embodiment and a second preferred embodiment.

Next, while referring to FIGS. 4(A) and 4(B), the effects of the first preferred embodiment will be compared with the conventional technology represented in FIGS. 1(A) and 1(B). For example, as represented in FIG. 1(A) for conventional technology, the present block is a movement command for positioning in the X-Y plane, the following block is a non-movement command for turning ON flow of coolant, and the block after that is another movement command for cutting in the direction of the Z axis. In the numerical control device 50 according to the first preferred embodiment, the large value of 1,000μ is employed for all axes for the post-execution in-position values for positioning in the X-Y plane and for the pre- and post-execution in-position values for turning ON flow of coolant (refer to Table 1 in the Appendix). Therefore, as represented in FIG. 4(A), flow of coolant is turned ON at time a' while positioning along the X and Y axes is still being executed when a distance of 1,000μ remains between the target position and the tool. Also, the block for cutting in the direction of the Z axis can be instantly retrieved. However, the small value of 10μ pre-execution in-position value is employed for the X and Y axes for cutting in the direction of the Z axis. Therefore, cutting in the direction of the Z axis is initiated at time b' after movement along the X and Y axes has completely stopped, as confirmed by whether the tool is within the small pre-execution in-position value for the X and Y axes. Accordingly, because machining is initiated after positioning is confirmed when cutting is to be performed in the direction of the Z axis after flow of coolant has been turned ON, machining operations are highly precise.

When, as represented in FIG. 1(B) for conventional technology, the movement command after the non-movement command is for positioning along the Z axis, in the numerical control device 50 according to the first preferred embodiment, the large value of 1,000μ is again employed for all axes for the post-execution in-position values for positioning along the X and Y axes and for the pre- and post-execution in-position values for turning ON flow of coolant. Therefore, as shown in FIG. 4(B), flow of coolant is turned ON at time c' while positioning along the X and Y axes is still being performed, that is, while a distance of 1,000μ remains between the actual position of the tool and the target position. Also, retrieving of the block for positioning in the direction of the Z axis can be instantly initiated. Additionally, the large value of 1,000μ is employed for the pre-execution in-position value for positioning in the direction of the Z axis. Therefore, the program can execute the command for positioning along the Z axis at time d'.

Because the program quickly proceeds to the next command in cases when accurate positioning is not necessary, the duration of time between time c' and e' of the machining the time t4 is shorter than the machining time t2 shown in FIG. 1(B) for conventional technology. In the example represented in FIG. 4(B), only the command for turning ON flow of coolant was prior to the command for positioning along the Z axis. However, even if there was a command for turning ON flow of coolant and a command for turning OFF the flow of coolant prior to the command for positioning along the Z axis, in the same manner the command for executing positioning along the Z axis could be executed directly after execution of the command for turning OFF flow of coolant. According to the first preferred embodiment, regardless of the program order for movement commands for positioning and cutting and for non-movement commands with short execution times, such as for turning ON or OFF flow of coolant, necessary precision is maintained and process time is reduced.

In the first preferred embodiment, in regards to a command for cutting in the direction of only one axis, the pre-execution in-position value for the commanded axis is set to a large value, and the pre-execution in-position values of all other axes are set to small values. For example, when cutting is to be performed in the direction of the Z axis, only the pre-execution in-position value of the Z axis is set to 1,000μ. The pre-execution in-position values of the X and Y axes are set to 10μ. When positioning or cutting is repeatedly performed in the same direction, for example, when positioning is performed along the Z axis and then cutting is performed in the direction of the Z axis, block commands can be quickly executed and movement processes are shortened.

In a numerical control device according to the first preferred embodiment, during execution of a command, the in-position value setting means sets the pre- and post-execution in-position values for the command in an in-position determination means, which is for determining whether the present position of a tool is within the in-position value. First, when execution of a command is initiated, a pre-execution in-position value confirmation means confirms whether the present position of a tool is within the pre-execution in-position value set in the in-position determination means. When execution of the present command is to be completed, a post-execution in-position confirmation means confirms whether the present position is within the post-execution in-position value set in the in-position determination means. After confirmation, the present command is completed and the program proceeds to processes for the following command. Therefore, regardless of the order in which commands are programmed, high precision can be maintained, and machining time can be decreased.

Figure 5:
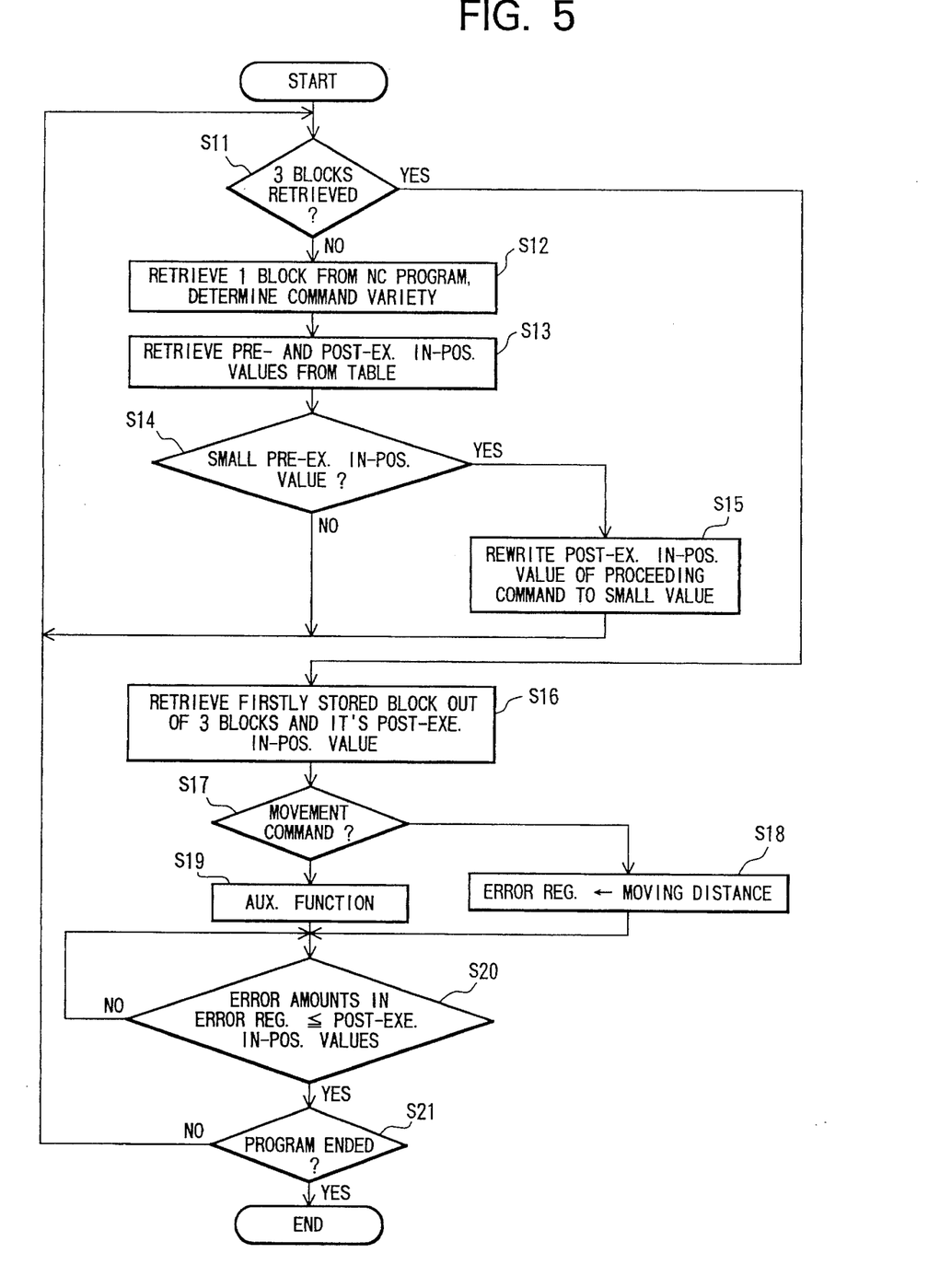
FIG. 5 is a flowchart representing operations followed by a numerical control device according to the second preferred embodiment.

Next, an explanation of a second preferred embodiment of the present invention will be provided while referring to FIG. 5. The configuration of means for the device of the second preferred embodiment is the same as shown in FIG. 2 for the device of the first preferred embodiment.

As in the first preferred embodiment, pre- and post-execution in-position values are determined based only on the present command. In the second preferred embodiment, however, when the small value is employed for the pre-execution in-position value of a command, the post-execution in-position value of at least one command prior to the present command is rewritten to the small value. When execution of the present command is completed, the second preferred embodiment confirms that the present position is within the post-execution in-position value. Afterward, the program proceeds to the next command. The pre-execution in-position value and the post-execution in-position value are stored in the non-volatile memory 53 in the form of Table 1 (shown in the Appendix). The set in-position value is determined based on the same standards as used in the first preferred embodiment.

In the flowchart shown in FIG. 5, after start of the automatic drive, whether the CPU 60 has completed retrieving out a predetermined number of blocks (three blocks in this example) from the numerical control program is determined in step 11. If not, the program proceeds to step 12 where one block command is retrieved from an NC program and the retrieved block command type is determined. In step 13, the in-position values that correspond to the retrieved block command are retrieved from Table 1 (shown in the Appendix) and stored in the RAM 52 as pre-execution in-position values and post-execution in-position values for each axis.

Whether the pre-execution in-position value is small, that is, whether 10μ, for each axis is determined in step 14. If small, the program proceeds to step 15 where post-execution in-position values for all axes of the command prior to the retrieved command are rewritten to the small value. For example, when the retrieved block command is for positioning along the Z axis, the pre-execution in-position values are large, that is, 1,000μ, for all axes. Therefore, the post-execution in-position value of the command before the retrieved command is not rewritten.

On the other hand, when the retrieved block command is for cutting in the direction of the Z axis, the pre-execution in-position value is small for the X and the Y axes. Therefore, the post-execution in-position values of the X and Y axis formerly retrieved are rewritten as small values as follows:

X axis post-execution in-position value=10μ; and

Y axis post-execution in-position value=10μ.

When the retrieved block command is for turning ON flow of coolant, the pre-execution in-position values for all axes are large values, that is 1,000μ. Therefore, the post-execution in-position value of the prior retrieved command is not rewritten.

When these processes are completed, the program returns to step 11, where a determination is again made as to whether the predetermined amount of blocks has been retrieved. If so, the program proceeds to step 16, where processes for executing one block command are performed. In step 16, the content of the first retrieved block of the plurality of blocks and the post-execution in-position values that were rewritten as necessary in step 5 are retrieved.

The program proceeds to the determination step 17, where a determination is made as to whether the command is a movement command. The program then proceeds to processes that correspond to the command. For example, if the command is a movement command (i.e., step 17 is YES), the program proceeds to step 18. The movement command value for the retrieved command is set in the error registers 58X, 58Y, and 58Z via the servo interface 55, whereupon pulse distribution processes are initiated. By this, the servo motors MX, MY, and MZ are driven. The error registers 58X, 58Y, and 58Z are decremented according to feedback generated from the positioning detectors PX, PY, and PZ. The servo motors MX, MY, and MZ are driven until the target position is reached when the error amounts $\epsilon x$, $\epsilon y$, and $\epsilon z$ in the error registers 58X, 58Y, and 58Z are reduced to zero.

On the other hand, when the command in step 17 is determined not to be a movement command, for example, when command is for turning ON the flow of coolant, the program will proceed to step 19, where auxiliary functions (such as turning ON the flow of coolant) are performed. The M code 08 of the retrieved block is outputted to the external portion I/O 59, whereupon a coolant valve (not shown) is opened so that lubrication oil is discharged therefrom. In addition to turning ON flow of coolant, in step 19, the numerical control device 60 performs operations for other auxiliary functions, such as turning OFF flow of coolant and Workpiece Replacement.

Whether the execution of processes for each axis has been completed is determined in step 20 by confirming the post-execution in-position value. Whether the present error amounts $\epsilon x$, $\epsilon y$, and $\epsilon z$ in the error registers 58X, 58Y, and 58Z for each axis are equal to or less than the post-execution in-position values (retrieved in step 16) for each axis is confirmed in the following manner:

$\epsilon x \leq$ X axis post-execution in-position value;

$\epsilon y \leq$ Y axis post-execution in-position value; and $\epsilon z \leq$ Z axis post-execution in-position value.

When the present error amounts $\epsilon x$, $\epsilon y$, and $\epsilon z$ for each axis are greater than the respective post-execution in-position values, then the determination in step 20 is NO, so that the program does not proceed to the next step.

When the present error amounts $\epsilon x$, $\epsilon y$, and $\epsilon z$ for each axis are equal to or less than the respective post-execution in-position values, confirming that the commanded processes are completed, the program proceeds to step 21, where a determination is made as to whether all programs have been completed. If not (i.e., step 21 is NO), the program returns to step 11, where the processes are initiated for the next block command. If so (i.e., step 21 is YES), automatic drive is completed.

In the situation represented in FIG. 1(A) for conventional technology, in the numerical control device 50 according to the second preferred embodiment, the large value of 1,000µ is employed for each axis for the post-execution in-position value for positioning along the X and Y axes and the pre-execution in-position value for turning ON flow of coolant (refer to Table 1 in the Appendix). The results are the same as shown for the first preferred embodiment in FIG. 4(A). That is, flow of coolant in turned ON at time a' while positioning along the X and Y axes is still being executed (with a remaining distance of 1,000µ). Because the pre-execution in-position value for cutting in the direction of the Z axis is a small value of 10µ for the X and Y axes, the post-execution in-position value for the X and Y of coolant ON is rewritten to 10µ. Cutting processes in the direction of the Z axis are only initiated at time b' after movement along the X and Y axes has completely stopped. Accordingly, even when a command for cutting in the direction of the Z axis follows a command for turning flow of coolant ON, processes are initiated after positioning along the X and Y axes has been confirmed. Therefore, machining is accurate.

In the situation represented in FIG. 1(B) for conventional technology as well, the numerical control device 50 according to the second preferred embodiment employs the large value of 1,000µ for each axis for the post-execution in-position value for positioning along the X and Y axes and the pre-execution in-position value for turning ON flow of coolant. Therefore, because the pre-execution in-position value for positioning along the X and Y axes is not rewritten, as shown in FIG. 4(B), flow of coolant is turned ON at time c' while positioning is still being performed along the X and Y axes (with a remaining distance of 1,000 microns). Because the post-execution in-position value for turning ON flow of coolant and the post-execution in-position value for positioning along the Z axis are the large values of 1,000µ for all axes, the post-execution in-position value for turning ON flow of coolant in not rewritten. Therefore, the command for positioning along the Z axis is executed immediately at time d'. In this way, when accurate positioning is not necessary, the program proceeds quickly to the next command. The duration of time from time c' to e' in the machining time t4 is shorter then the corresponding time shown in FIG. 1(B) for conventional technology.

In the numerical control device according to the second preferred embodiment, a command retrieving means retrieves a plurality of blocks of a numerical control block program. An in-position value memory means stores pre- and post-execution in-position values corresponding to the command retrieved by the command retrieving means. When the pre-execution in-position values stored in the in-position value memory means is a small value, the post-execution in-position value stored in the in-position value memory means that immediately proceeds the command retrieved by the command retrieving means is rewritten to a small value. The in-position determination means determines whether the present position is within the set in-position value. While the command is being executed, the in-position value setting means sets in the in-position determination means the post-execution in-position value stored in the in-position value memory means. When execution of the command is to be terminated and the program is to proceed to execution of the next command, the post-execution in-position confirmation means confirms whether the present position is within the post-execution in-position value set in the in-position determination means. Therefore, no matter what order the different commands are programmed, high precision can be maintained, and machining time can be reduced.

While the invention has been described in detail with reference to specific embodiments thereof, it would be apparent to those skilled in the art that various changes and modifications may be made therein without departing from the spirit of the invention, the scope of which is defined by the attached claims.

TABLE 1

| | | APPENDIX | | | | | |
|---|---|---|---|---|---|---|---|
| | | Pre-ex. In-pos. (μ) | | | Post-ex. In-pos. (μ) | | |
| Commands | Comb. | X | Y | Z | X | Y | Z |
| Positioning (G00) | All | 1,000 | 1,000 | 1,000 | 1,000 | 1,000 | 1,000 |
| Cutting (G01) | X only | 1,000 | 10 | 10 | 10 | 10 | 10 |
| | Y only | 10 | 1,000 | 10 | 10 | 10 | 10 |
| | Z only | 10 | 10 | 1,000 | 10 | 10 | 10 |
| | Others | 10 | 10 | 10 | 10 | 10 | 10 |
| Aux. Func (M08) Coolant ON | ***** | 1,000 | 1,000 | 1,000 | 1,000 | 1,000 | 1,000 |
| Aux. Func (M09) Coolant OFF | ***** | 1,000 | 1,000 | 1,000 | 1,000 | 1,000 | 1,000 |
| Aux. Func (M77) Workpiece replacement | ***** | 10 | 10 | 10 | 1,000 | 1,000 | 1,000 |

What is claimed is:

1. A numerical control device for performing machining processes using a numerical control program contained in a microprocessor system comprising:

retrieving means for retrieving consecutive blocks of the numerical control program on a block-by-block basis, the numerical control program being prepared for performing machining processes;

memory means for storing a pre-execution in-position value and a post-execution in-position value for each of the blocks of the numerical control program, the pre-execution in-position value indicating a first tolerance associated with a corresponding block to be obtained before the numerical control program is executed, the post-execution in-position value indicating a second tolerance associated with the corresponding block to be obtained after the numerical control program has been executed;

control means for controlling execution of the block of the numerical control program in accordance with at least one of the corresponding pre-execution in-position value and the post-execution in-position value; and machining means for performing the machining process in accordance with the block of the numerical control program.

2. A numerical control device according to claim 1, wherein said control means includes in-position determining means for determining whether a current machining processing position is between the pre-execution in-position value and the post-execution in-position value.

3. A numerical control device according to claim 2, wherein said control means includes:

pre-execution determining means for comparing the pre-execution in-position value stored in said memory means with the current machining processing position and outputting a first comparison result; and execution means for executing the block of the numerical control program retrieved from said retrieving means when said first comparison result output from said pre-execution determining means indicates that the current machining processing time is within the first tolerance.

4. A numerical control device according to claim 3, wherein said control means further includes post-execution determining means for comparing The post-execution position value stored in said memory means with the current machining processing position and outputting a second comparison result, wherein said retrieving means retrieves successive block of the numerical control program when said second comparison result output from said post-execution determining means indicates that the current machining processing position is within the second range of position.

5. A numerical control device according to claim 4, further comprising moving means for moving a tool relative to a workpiece to be machined by said tool, wherein when the block of the numerical control program indicates positioning of the tool, said pre-execution determining means compares a current position of said tool with the pre-execution in-position value indicating a first allowable range of position where said tool is positioned before the corresponding block of the numerical control program is executed, the first allowable range of position being equivalent to the first tolerance, and said post-execution determining component compares the current position of said tool with the post-execution in-position value indicating a second allowable range of position where said tool is positioned after the corresponding block of the numerical control program has been executed, the second allowable range of position being equivalent to the second tolerance.

6. A numerical control device according to claim 5, wherein said moving means comprises an X-axis servo motor for moving the tool in an X-direction, a Y-axis servo motor for moving the tool in a Y-direction perpendicular to the X-direction, and a Z-axis servo motor for moving the tool in a Z-direction perpendicular to both the X-direction and the Y-direction.

7. A numerical control device according to claim 6, wherein when the block of the numerical control program indicates positioning of the tool, said memory means stores the pro-execution in-position value and the poet-execution in-position value with respect to a position of the tool in each of the X-direction, Y-direction and Z-direction, said pro-execution determining means compares the current position of said tool with the pre-execution in-position value in each of the X-direction, Y-direction and Z-direction, and said poet-execution determining means compares the current position of said tool with the post-execution in-position value in each of the X-direction, Y-direction and Z-direction.

8. A numerical control device according to claim 1, wherein each of the pro-execution in-position value and the post-execution in-position value takes one of at least 1000 microns and 10 microns or less.

9. A numerical control device according to claim 8, further comprising rewriting means for rewriting the large post-execution in-position value of a block of the numerical control program to the small poet-execution in-position value when the pre-execution in-position value of the successive block of the numerical control program is small.

10. A numerical control device according to claim 9, wherein said retrieving means retrieves a predetermined number of blocks of the numerical control program before executing a firstly retrieved block of the numerical control program.

11. A numerical control device according to claim 9, wherein said rewriting means performs rewriting when two consecutive blocks of the numerical control program are retrieved.

12. A numerical control device according to claim 11, wherein said control means includes in-position determining means for determining whether a current machining processing position is within the post-execution in-position value, and execution means for executing the block of the numerical control program when the current machining processing position is within the post-execution in-position value of immediately preceding block of the numerical control program retrieved by said retrieving means.

13. A numerical control device according to claim 12, further comprising moving means for moving a tool relative to a workpiece to be machined by said tool, wherein when the block of the numerical control program indicates positioning of the tool, said in-position determining means compares a current position of said tool with the post-execution in-position value indicating an allowable range of position where said tool is positioned after the corresponding block of the numerical control program has been executed, the allowable range of position being equivalent to the first tolerance.

14. A numerical control device according to claim 13, wherein said moving means comprises an X-axis servo motor for moving the tool in an X-direction, a Y-axis servo motor for moving the tool in a Y-direction perpendicular to the X-direction, and a Z-axis servo motor for moving the tool in a Z-direction perpendicular to both the X-direction and the Y-direction.

15. A numerical control device according to claim 14, wherein when the block of the numerical control program indicates positioning of the tool, said memory means stores the pre-execution in-position value and the post-execution in-position value with respect to a position of the tool in each of the X-direction, Y-direction and Z-direction, and said in-position determining means compares the current position of said tool with the post-execution in-position value in each of the X-direction, Y-direction and Z-direction.

16. A method of performing machining processes with a numerical control device using a numerical control program contained in a microprocessor system, comprising the steps of:

retrieving consecutive blocks of the numerical control program on a block-by-block basis;

storing a pre-execution in-position value and a post-execution in-position value for each of the blocks of the numerical control program in a memory, the pre-execution in-position value indicating a first tolerance associated with a corresponding block to be obtained before the numerical control program is executed, the post-execution in-position value indicating a second tolerance associated with the corresponding block to be obtained after the numerical control program has been executed;

controlling execution of the block of the numerical control program in accordance with at least one of the corresponding pre-execution in-position value and the post-execution in-position value; and performing the machining process in accordance with the block of the numerical control program.

17. A method according to claim 16, further comprising the steps of comparing the pre-execution in-position value with a current machining processing position, and executing the block of the numerical control program when the current machining processing position is within the pre-execution in-position value.

18. A method according to claim 17, further comprising the steps of comparing the post-execution in-position value with the current machining processing position and retrieving successive block of the numerical control program when the current machining processing position is within the post-execution in-position value.

19. A method according to claim 16, further comprising the steps of:

retrieving a predetermined number of blocks of the numerical control program before executing a firstly retrieved block of the numerical control program;

when two consecutive blocks of the numerical control program are retrieved, rewriting a large post-execution in-position value of a formerly retrieved block of the numerical control program to a small post-execution in-position value when the pre-execution in-position value of the subsequently retrieved block of the numerical control program is small; and executing the block of numerical control program in accordance with the post-execution in-position value.

20. A numerical control device for performing machining processes using a numerical control program contained in a microprocessor system comprising:

a processing means that retrieves consecutive blocks of the numerical control program of a program source prepared for performing machining processes;

a memory cooperating with said processing means, said memory stores a pre-execution in-position value and a post-execution in-position value for each of the blocks of the numerical control program, the pre-execution in-position value indicating a first tolerance associated with a corresponding block to be obtained before the numerical control program is executed, the post-execution in-position value indicating a second tolerance associated with the corresponding block to be obtained after the numerical control program has been executed;

a controller that controls execution of the block of the numerical control program in accordance with at least one of the corresponding pre-execution in-position value and the post-execution in-position value; and a tool that performs the machining process in accordance with the block of the numerical control program.

21. The numerical control device according to claim 20, wherein said controller includes an in-position determining processor that determines whether a current machining processing position is within the pre-execution in-position value and the post-execution in-position value.

22. The numerical control device according to claim 21, wherein said controller includes:

a pre-execution determining processor that compares the pre-execution in-position value stored in said memory with the current machining processing position and outputting a first comparison result; and an execution processor that executes the block of the numerical control program retrieved from said processing means when said first comparison result output from said pre-execution determining processor indicates that the current machining processing position is within the first tolerance.

23. The numerical control device according to claim 22, wherein said controller further includes a post-execution determining processor that compares the post-execution in-position value stored in said memory with the current machining processing position and outputting a second comparison result, wherein said processing means retrieves successive block of the numerical control program when said second comparison result output from said post-execution determining processor indicates that the current machining processing position is within the second tolerance.

24. The numerical control device according to claim 23, further comprising a motor that moves the tool relative to a workpiece to be machined by said tool, said motor being connected to said controller and said tool, wherein when the block of the numerical control program indicates positioning of the tool, said pre-execution determining processor compares a current position of said tool with the pre-execution in-position value indicating a first allowable range of position where said tool is positioned before the corresponding block of the numerical control program is executed, the first allowable range of position being equivalent to the first tolerance, and said post-execution determining processor compares the current position of said tool with the post-execution in-position value indicating a second allowance range of position where said tool is positioned after the corresponding block of the numerical control program has been executed, the second allowable range of position being equivalent to the second tolerance.

25. The numerical control device according to claim 24, wherein said motor comprises an X-axis servo motor for moving the tool in an X-direction, a Y-axis servo motor for moving the tool in a Y-direction perpendicular to the X-direction, and a Z-axis servo motor for moving the tool in a Z-direction perpendicular to both the X-direction and the Y-direction.

26. The numerical control device according to claim 25, wherein when the block of the numerical control program indicates positioning of the tool, said memory stores the pre-execution in-position value and the post-execution in-position value with respect to a position of the tool in each of the X-direction, Y-direction and Z-direction, said pre-execution determining processor compares the current position of said tool with the pre-execution in-position value in each of the X-direction, Y-direction and Z-direction, and said post-execution determining processor compares the current position of said tool with the post-execution in-position value in each of the X-direction, Y-direction and Z-direction.

27. The numerical control device according to claim 20, where in each of the pre-execution in-position value and the post-execution in-position value takes one of at least 1000 microns and 10 microns or less.

28. The numerical control device according to claim 27, further comprising a rewriting controller that rewrites the large post-execution in-position value of a block of the numerical control program to the small post-execution in-position value when the pre-execution in-position value of the successive block of the numerical control program is small; said rewriting controller being connected to said memory.

29. The numerical control device according to claim 28, wherein said processing means retrieves a predetermined number of blocks of the numerical control program before executing a firstly retrieved block of the numerical control program.

30. The numerical control device according to claim 28, wherein said rewriting controller performs rewriting when two consecutive blocks of the numerical control program are retrieved.

31. The numerical control device according to claim 30, wherein said controller includes a in-position determining processor that determines whether a current machining processing position is within the post-execution in-position value, and an execution processor that executes the block of the numerical control program when the current machining processing position is within the post-execution in-position value of immediately preceding block of the numerical control program retrieved by said processing means.

32. The numerical control device according to claim 31, further comprising a motor that moves the tool relative to a workpiece to be machined by said tool, said motor being connected to said controller and said tool, wherein when the block of the numerical control program indicates positioning of the tool, said in-position determining processor compares a current position of said tool with the post-execution in-position value indicating an allowable range of position where said tool is positioned after the corresponding block of the numerical control program has been executed, the allowable range of position being equivalent to the first tolerance.

33. The numerical control device according to claim 32, wherein said motor comprises an X-axis servo motor for moving the tool in an X-direction, a Y-axis servo motor for moving the tool in a Y-direction perpendicular to the X-direction, and a Z-axis servo motor for moving the tool in a Z-direction perpendicular to both the X-direction and the Y-direction.

34. A numerical control device according to claim 33, wherein when the block of the numerical control program indicates positioning of the tool, said memory stores the pre-execution in-position value and the post-execution in-position value with respect to a position of the tool in each of the X-direction, Y-direction and Z-direction, and said in-position determining component compares the current position of said tool with the post-execution in-position value in each of the X-direction, Y-direction and Z-direction.

\* \* \* \* \*